(12) United States Patent
Kim et al.

(10) Patent No.: US 12,503,592 B2
(45) Date of Patent: Dec. 23, 2025

(54) POLYALKYLENE CARBONATE-POLYACTIC ACID COMPOSITE, METHOD OF PREPARING THE SAME, AND MOLDED ARTICLE PREPARED BY USING THE COMPOSITE

(71) Applicant: LG CHEM, LTD., Seoul (KR)

(72) Inventors: Sung Kyoung Kim, Daejeon (KR); Seung Young Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 727 days.

(21) Appl. No.: 17/278,602

(22) PCT Filed: Dec. 20, 2019

(86) PCT No.: PCT/KR2019/018251
§ 371 (c)(1),
(2) Date: Mar. 22, 2021

(87) PCT Pub. No.: WO2020/130736
PCT Pub. Date: Jun. 25, 2020

(65) Prior Publication Data
US 2021/0332236 A1    Oct. 28, 2021

(30) Foreign Application Priority Data
Dec. 20, 2018    (KR) .................. 10-2018-0166051

(51) Int. Cl.
*C08L 69/00*    (2006.01)
*C08J 3/11*    (2006.01)
*C08L 67/04*    (2006.01)

(52) U.S. Cl.
CPC .................. *C08L 69/00* (2013.01); *C08J 3/11* (2013.01); *C08L 67/04* (2013.01); *C08J 2367/04* (2013.01); *C08J 2369/00* (2013.01); *C08J 2467/02* (2013.01); *C08J 2467/04* (2013.01); *C08J 2469/00* (2013.01); *C08L 2205/03* (2013.01)

(58) Field of Classification Search
None
See application file for complete search history.

(56) References Cited

U.S. PATENT DOCUMENTS

| | | |
|---|---|---|
| 5,665,428 A | 9/1997 | Cha et al. |
| 2003/0013821 A1 | 1/2003 | Tan et al. |
| 2011/0309539 A1 | 12/2011 | Steinke et al. |
| 2012/0040185 A1 | 2/2012 | Topolkaraev et al. |
| 2012/0178896 A1 | 7/2012 | Bastioli et al. |
| 2015/0025163 A1* | 1/2015 | Park .................. C08L 97/02 521/134 |

(Continued)

FOREIGN PATENT DOCUMENTS

| | | |
|---|---|---|
| CN | 104428368 A | 3/2015 |
| CN | 104744898 A | 7/2015 |

(Continued)

*Primary Examiner* — Anthony J Frost
(74) *Attorney, Agent, or Firm* — Bryan Cave Leighton Paisner LLP

(57) ABSTRACT

The present disclosure relates to a polyalkylene carbonate-polylactic acid composite having improved mechanical properties as well as excellent transparency and flexibility, a method of preparing the same, and a molded article prepared by using the polyalkylene carbonate-polylactic acid composite.

9 Claims, 1 Drawing Sheet

(56) References Cited

U.S. PATENT DOCUMENTS

| | | | | |
|---|---|---|---|---|
| 2015/0105521 A1* | 4/2015 | Shoji | ....................... | C08L 67/04 |
| | | | | 525/437 |
| 2015/0337097 A1* | 11/2015 | Ishida | ..................... | B32B 27/08 |
| | | | | 428/480 |
| 2016/0145431 A1 | 5/2016 | Cho et al. | | |
| 2017/0051132 A1* | 2/2017 | Yamanaka | ................ | D01F 1/07 |
| 2021/0246305 A1 | 8/2021 | Kim et al. | | |

FOREIGN PATENT DOCUMENTS

| | | | |
|---|---|---|---|
| CN | 105051108 | A | 11/2015 |
| CN | 108424626 | A | 8/2018 |
| EP | 3795615 | A1 | 3/2021 |
| JP | 08183045 | A | 7/1996 |
| JP | 2006265395 | A | 10/2006 |
| KR | 1999-0067014 | A | 8/1999 |
| KR | 10-2011-0127727 | A | 11/2011 |
| KR | 10-2013-0097152 | A | 9/2013 |
| KR | 10-2015-0036149 | A | 4/2015 |
| KR | 10-2016-0038590 | A | 4/2016 |
| KR | 1020160097009 | A | 8/2016 |
| KR | 10-2016-0108062 | A | 9/2016 |
| KR | 10-2018-0110631 | A | 10/2018 |
| WO | 2014003191 | A1 | 1/2014 |

\* cited by examiner

[FIG. 1]
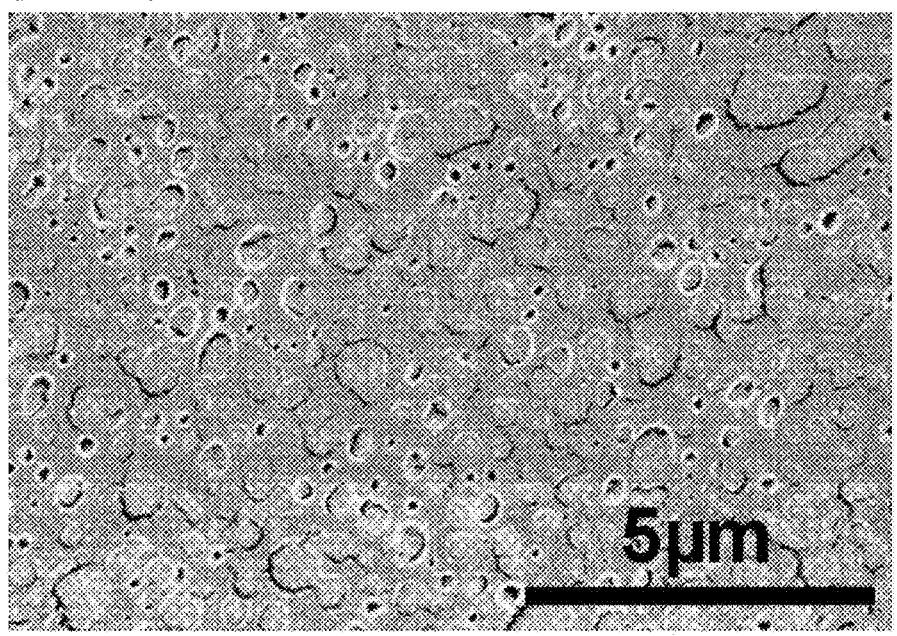
[FIG. 2]
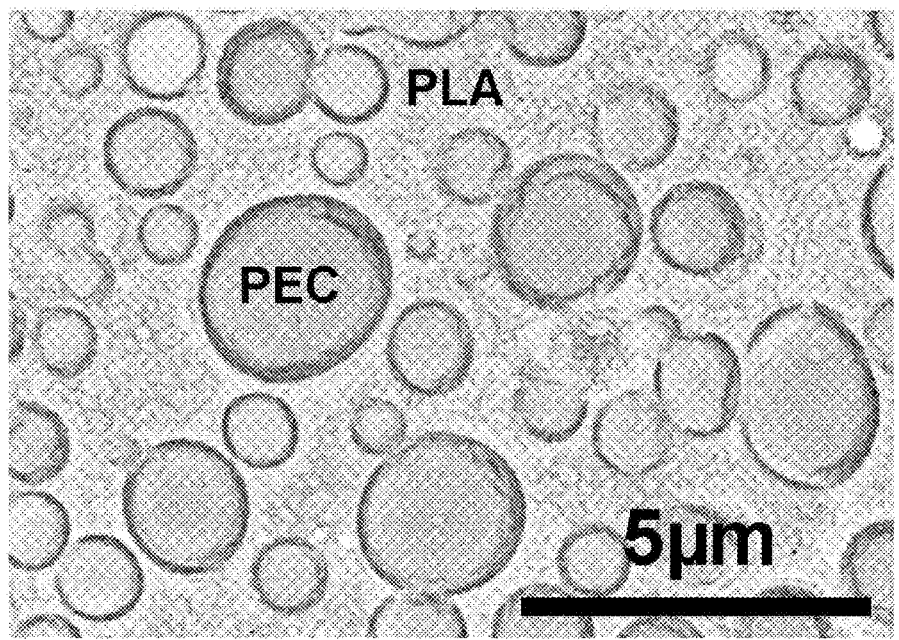

POLYALKYLENE CARBONATE-POLYACTIC ACID COMPOSITE, METHOD OF PREPARING THE SAME, AND MOLDED ARTICLE PREPARED BY USING THE COMPOSITE

CROSS-REFERENCE TO RELATED APPLICATIONS

This application is a National Phase entry pursuant to 35 U.S.C. § 371 of International Application No. PCT/KR2019/018251, filed on Dec. 20, 2019, and claims the benefit of and priority to Korean Patent Application No. 10-2018-0166051, filed on Dec. 20, 2018, in the Korean Intellectual Property Office, all of which are hereby incorporated by reference in their entirety for all purposes as if fully set forth herein.

TECHNICAL FIELD

The present invention relates to a polyalkylene carbonate-polylactic acid composite having improved mechanical properties as well as excellent transparency and flexibility, a method of preparing the same, and a molded article prepared by using the polyalkylene carbonate-polylactic acid composite.

BACKGROUND ART

Plastics are being used as raw materials for various articles due to ease of preparation and convenience of use, and are being used in various fields not only for disposable articles, such as packaging films, disposable cups, and disposable plates, but also for building materials and automotive interior materials.

However, an amount of plastic waste increases as an amount of plastics used increases, and, since most plastics are not decomposed in the natural environment, the plastic waste is mainly treated by incineration, but there is a problem of causing environmental pollution because toxic gases are emitted during the incineration. Thus, biodegradable plastics, which are naturally degraded in the natural environment, have recently been developed.

Biodegradable plastics are plastics that are degraded slowly in water due to their chemical structure, wherein, in wet environments such as soil or seawater, the biodegradable plastics start to be degraded within a few weeks and disappear within one to several years. In addition, degradation products of the biodegradable plastics are less harmful to the environment because they are decomposed into harmless components such as water or carbon dioxide.

Polylactic acid is widely known as one of the biodegradable plastics. The polylactic acid has excellent tensile strength, but it is easy to be broken because brittleness is poor due to unique hard properties, it is not stable to mechanical shock because its elongation is less than 10%, and processing may be difficult because the polylactic acid has a drawback in that it is easily deformed by heat due to the lack of thermal stability. Thus, in order to improve flexibility, the polylactic acid is used by being mixed with a plasticizer or the like, wherein there is a limitation in that the plasticizer may flow out to a surface of a molded article as time passes to degrade quality such as transparency.

Alternatively, physical properties, such as flexibility, transparency, and gas barrier properties, have been desired to be improved by mixing with polyalkylene carbonate as a biodegradable plastic, but it is not easy to secure mechanical properties, such as transparency, flexibility, and tensile strength, due to a compatibility issue between the polylactic acid and the polyalkylene carbonate during the mixing, and there is an issue in that it is difficult to secure the desired physical properties because intrinsic properties of each material are affected by a mixing method.

In consideration of these issues, Korean Patent Application Laid-open Publication No. 10-2016-0108062 discloses a method of preparing a polyalkylene carbonate/polylactic acid composite by a solvent mixing method (solution mixing method) using a chlorinated solvent such as dichloromethane. However, the polyalkylene carbonate/polylactic acid composite prepared by the solvent mixing method may exhibit excellent properties in terms of tensile properties, transparency, and flexibility, but, since the chlorinated solvent may remain in the composite and may migrate to a surface during the preparation of a molded article using the composite or during the use of the prepared molded article to adversely affect the human body, there is a limitation in that it may not be used in food containers or products in direct contact with the human body.

Thus, there is a need to develop a biodegradable plastic material, which may be easily used as a material for food containers, while having a balance of excellent transparency, flexibility, and mechanical properties.

PRIOR ART DOCUMENT (Patent Document 1) KR 2016-0108062 A

DISCLOSURE OF THE INVENTION

Technical Problem

The present invention provides a polyalkylene carbonate-polylactic acid composite having improved mechanical properties as well as excellent transparency and flexibility.

The present invention also provides a method of preparing the polyalkylene carbonate-polylactic acid composite.

The present invention also provides a molded article prepared by using the polyalkylene carbonate-polylactic acid composite.

Technical Solution

According to an aspect of the present invention, there is provided a polyalkylene carbonate-polylactic acid composite including a continuous phase and a dispersed phase, wherein a domain size of the dispersed phase is in a range of 0.2 μm to 1.0 μm, and a halogen component is not included in the composite.

According to another aspect of the present invention, there is provided a method of preparing the polyalkylene carbonate-polylactic acid composite which includes steps of: preparing a mixed solution by stirring polyalkylene carbonate and polylactic acid in the presence of a non-halogen ether-based solvent (step 1); and devolatilizing and extruding the mixed solution (step 2).

According to another aspect of the present invention, there is provided a molded article prepared by using the polyalkylene carbonate-polylactic acid composite.

Advantageous Effects

Since a polyalkylene carbonate-polylactic acid composite according to the present invention is prepared by solution mixing of polyalkylene carbonate and polylactic acid, a domain size of a dispersed phase is finely and uniformly adjusted to 0.2 µm to 1.0 µm so that transparency is effectively improved while mechanical properties and flexibility are excellent and processing stability may be excellent when used in the subsequent preparation of a molded article. Also, since the composite is prepared in the presence of a non-halogen ether-based solvent, the composite may be easily used in a product which may directly affect the human body, such as a food container.

Furthermore, in a method of preparing a polyalkylene carbonate-polylactic acid composite according to the present invention, since polyalkylene carbonate and polylactic acid are solution mixed using a low-toxicity non-halogen ether-based solvent, compatibility between the materials is excellent, and thus, a more environmentally-friendly composite having excellent transparency, flexibility, and mechanical properties may be prepared.

In addition, since a molded article according to the present invention is prepared by using the polyalkylene carbonate-polylactic acid composite, transparency, flexibility, and mechanical properties may be excellent.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 1 is a scanning electron microscope (SEM) image of a cross-section of a pellet-type composite of Example 1 according to an embodiment of the present invention; and FIG. 2 is a scanning electron microscope (SEM) image of a cross-section of a pellet-type composite of Comparative Example 1 according to an embodiment of the present invention.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Terms and measurement method used in the present invention may be defined as follows unless otherwise defined.

Terms

The term "composite" used in the present invention denotes a material in a state in which two or more materials are combined to obtain physically and chemically excellent properties, wherein, for example, a polyalkylene carbonate-polylactic acid composite in the present invention may have a meaning including a master batch. Herein, the master batch represents a pellet in which plastic is mixed at a high concentration and dispersed, wherein, since the master batch is mixed with a raw material plastic and molded during the preparation of a molded article, excellent physical properties of the master batch may be easily expressed in the molded article.

The term "compatibility" used in the present invention refers to a property of being uniformly mixed or dispersed together when different materials are mixed.

The term "domain" used in the present invention refers to an area of a dispersed phase which is divided into a boundary between a continuous phase and the dispersed phase in a system in which the continuous phase and the dispersed phase are mixed.

The term "continuous phase" used in the present invention means a continuous phase surrounding a phase dispersed in a system in which two phases are mixed, wherein it is also called a matrix. Also, the term "dispersed phase" used in the present invention means a material constituting a dispersed system, that is, a phase constituting particles in a system in which two phases are mixed.

In the polyalkylene carbonate-polylactic acid composite of the present invention, a continuous phase and a dispersed phase may be determined according to a mixing ratio of polyalkylene carbonate and polylactic acid which are used in the preparation of the composite, and, for example, a material having a substantially high mixing ratio, among the polyalkylene carbonate and the polylactic acid, may become the continuous phase.

[Measurement Method]

In the present invention, "weight-average molecular weight (g/mol)" was measured by gel permeation chromatography (GPC) analysis, wherein, specifically, in the GPC, two PLgel Olexis columns (Polymer Laboratories) and one PLgel mixed-C column (Polymer Laboratories) were combined and used, chloroform was used as a measurement solvent, the measurement was made with a differential refractive index detector (RI) at a flow rate of 1.0 ml/min and a column temperature of 40° C., and polystyrene (PS) was used as a GPC standard material.

Since a polyalkylene carbonate-polylactic acid composite of the present invention is prepared by a preparation method to be described later in which polyalkylene carbonate and polylactic acid are solution mixed in the presence of a non-halogen ether-based solvent, a domain size of a dispersed phase is finely and uniformly adjusted to a predetermined range, and thus, the present invention provides the polyalkylene carbonate-polylactic acid composite which has significantly good transparency as well as excellent mechanical properties and flexibility and may be used in a wide range of materials, for example, products that may directly affect the human body, such as food containers, because the composite does not include a halogen component. The composite according to an embodiment of the present invention is characterized in that it includes a continuous phase and a dispersed phase, wherein a domain size of the dispersed phase is in a range of 0.2 µm to 1.0 µm, and a halogen component is not included in the composite.

As the amount of plastics used increases, waste issues and environmental issues have emerged, and thus, the use of biodegradable plastics that are naturally degraded in the natural environment has expanded. Polylactic acid is the most widely known as a biodegradable plastic, wherein the polylactic acid has excellent mechanical properties with high rigidity, but the lack of flexibility limits industrial applications and, in order to compensate for this, the polylactic acid is usually used by being mixed with a plasticizer or other biodegradable plastics such as polyalkylene carbonate. However, there is a limitation in that the plasticizer may flow out to a surface of a product as time passes to degrade appearance characteristics, such as transparency, of the product.

Also, melt mixing or solution mixing is usually used during the mixing with the polyalkylene carbonate, wherein, with respect to the melt mixing, since two plastics may be mixed in a melt state, a portion, where the two plastics are not uniformly mixed in comparison to a state in which the two plastics are completely dissolved in a solvent, may occur, and, as a result, transparency, flexibility, and mechanical properties may not be secured with balance. With respect to the solution mixing, two plastics may be mixed more uniformly because polymer swelling by a solvent occurs and the mixing is performed while polymer chains are loosened, but, since the solvent capable of easily dissolving plastics must be used, the solution mixing is usually performed using a toxic solvent such as a halogen-based solvent, and thus, there is a limitation in that it may not be used in a product capable of directly affecting the human body, such as a food container, due to a residual halogen component that is derived from the halogen-based solvent and toxic to the human body.

However, since mechanical properties and stability of the polyalkylene carbonate-polylactic acid composite according to the present invention may be improved by including polyalkylene carbonate and polylactic acid, molding stability may be excellent when the composite is used in the preparation of a molded article. A homogeneous formulation may be formed because mixing is performed by solution mixing in the presence of a low-toxicity non-halogen ether-based solvent, a domain size of the dispersed phase in the matrix may be uniformly controlled in a specific range so that transparency, flexibility, and mechanical properties may be excellent with balance, and the composite may be easily used in a product capable of directly affecting the human body, such as a food container.

Specifically, the polyalkylene carbonate-polylactic acid composite according to an embodiment of the present invention is one prepared by a preparation method to be described later, that is, one does not include a halogen component because it is prepared by solution mixing of polyalkylene carbonate and polylactic acid in the presence of a non-halogen ether-based solvent, wherein the polyalkylene carbonate-polylactic acid composite includes a continuous phase and a dispersed phase, a domain size of the dispersed phase may be in a range of 0.2 µm to 1.0 µm, and thus, there is an effect of significantly improving transparency.

Also, the polyalkylene carbonate-polylactic acid composite does not include a halogen component, and may include the non-halogen ether-based solvent in an amount of 0.1 wt % or less based on 100 wt % of the total composite.

The non-halogen ether-based solvent is not particularly limited as long as it, as a low-toxicity organic solvent containing no halogen element, may easily dissolve polyalkylene carbonate, polylactic acid, and aliphatic/aromatic polyester, but the non-halogen ether-based solvent may specifically include at least one selected from the group consisting of 1,3-dioxolane, 1,2-dioxolane, and dioxane, and may more specifically include 1,3-dioxolane. As described above, since the composite does not include a halogen component, the composite may be easily used in a product capable of directly affecting the human body, such as a food container, and thus, there is an effect that industrial applicability is very good.

Furthermore, the composite includes polyalkylene carbonate and polylactic acid, wherein the polyalkylene carbonate and the polylactic acid may be included in a weight ratio of 1:9 to 9:1, for example, 1:1 to 7:3. In this case, since transparency, flexibility, and mechanical properties may be achieved with balance by the polyalkylene carbonate and polylactic acid, the transparency, flexibility, and mechanical properties may be excellent.

As another example, the composite according to the embodiment of the present invention may further include an aliphatic/aromatic polyester, that is, the composite may be one prepared by solution mixing of polyalkylene carbonate, polylactic acid, and aliphatic/aromatic polyester.

In this case, the composite includes the polyalkylene carbonate, the polylactic acid, and the aliphatic/aromatic polyester, wherein the polyalkylene carbonate, the polylactic acid, and the aliphatic/aromatic polyester may be included in a weight ratio of 1:1:0.1 to 5:5:1 (or 1 to 5:1 to 5:0.1 to 1). In a case in which the polyalkylene carbonate, the polylactic acid, and the aliphatic/aromatic polyester are included in the above ratio, transparency, flexibility, and mechanical properties may be achieved with balance by the polyalkylene carbonate and polylactic acid, and flexibility, mechanical properties, and processing stability may be further improved by the aliphatic/aromatic polyester.

In the present invention, the polyalkylene carbonate is a polymer having a repeating unit of —COO—$(CH_2)_n$—$CH_2CH_2O$— (where n is an integer of 2 to 12), wherein the polyalkylene carbonate may specifically include at least one selected from the group consisting of polyethylene carbonate, polypropylene carbonate, polypentene carbonate, polyhexene carbonate, polyoctene carbonate, and polycyclohexene carbonate, and may more specifically include polyethylene carbonate or polypropylene carbonate.

Also, the polyalkylene carbonate may have a weight-average molecular weight of 10,000 g/mol to 1,000,000 g/mol, for example, 50,000 g/mol to 500,000 g/mol or 100,000 g/mol to 200,000 g/mol. In this case, the flexibility of the composite including the same may be excellent.

The polyalkylene carbonate in the present invention may be a copolymer or terpolymer which is prepared by copolymerization using an epoxide-based compound and carbon dioxide as monomers in the presence of an organometallic catalyst in an organic solvent.

In this case, the epoxide-based compound, for example, may include at least one selected from the group consisting of ethylene oxide, propylene oxide, 1-butene oxide, 2-butene oxide, isobutylene oxide, 1-pentene oxide, 2-pentene oxide, 1-hexene oxide, 1-octene oxide, cyclopentene oxide, cyclohexene oxide, styrene oxide, and butadiene monoxide, and the carbon dioxide, for example, may be controlled to a pressure of 5 atm to 30 atm, and the copolymerization may be performed at 20° C. to 120° C.

Furthermore, the organic solvent, for example, may include at least one selected from the group consisting of aliphatic hydrocarbons, such as pentane, octane, decane, and cyclohexane, aromatic hydrocarbons, such as benzene, toluene, and xylene, and halogenated hydrocarbons such as chloromethane, methylene chloride, chloroform, carbon tetrachloride, 1,1-dichloroethane, 1,2-dichloroethane, ethylchloride, trichloroethane, 1-chloropropane, 2-chloropropane, 1-chlorobutane, 2-chlorobutane, 1-chloro-2-methylpropane, chlorobenzene, and bromobenzene.

Also, the polylactic acid is a polymer prepared by using lactic acid as a monomer, wherein the polylactic acid may include at least one selected from the group consisting of poly(L-lactic acid), poly(D-lactic acid), and poly(L,D-lactic acid).

Furthermore, the polylactic acid may have a weight-average molecular weight of 70,000 g/mol to 300,000 g/mol, and, in this case, mechanical properties may be better.

Also, the aliphatic/aromatic polyester in the present invention is a polyester compound having a unit derived from an aliphatic dicarboxylic acid or a derivative thereof and a unit derived from an aromatic dicarboxylic acid or a derivative thereof, wherein the aliphatic/aromatic polyester may be prepared by polycondensation of an aliphatic dicarboxylic acid or a derivative thereof, an aromatic dicarboxylic acid or a derivative thereof, and an aliphatic dihydric alcohol.

The aliphatic dicarboxylic acid or derivative thereof, for example, may include at least one selected from the group consisting of succinic acid, glutaric acid, malonic acid, oxalic acid, adipic acid, sebacic acid, azelaic acid, nonadicarbosyl acid, and a C1-C12 alkyl or aryl ester derivative thereof, and the aromatic dicarboxylic acid or derivative thereof may include at least one selected from the group consisting of terephthalic acid, phthalic acid, isophthalic acid, naphthalene-2,6-dicarboxylic acid, diphenylsulfonic acid dicarboxylic acid, diphenylmethanedicarboxylic acid, diphenyletherdicarboxylic acid, diphenoxyethanedicarboxylic acid, cyclohexanedicarboxylic acid, or an alkyl ester thereof. Furthermore, the aliphatic dihydric alcohol, for example, may include at least one selected from the group consisting of 1,2-propanediol, 1,2-butanediol, 1,2-pentanediol, 1,3-pentanediol, 1,4-pentanediol, 1,2-hexanediol, 1,3-hexanediol, 1,5-hexanediol, 1,2-octanediol, 1,3-octanediol, 1,4-octanediol, 1,5-octanediol, and 1,6-octanediol.

Specifically, the aliphatic/aromatic polyester may include at least one selected from the group consisting of polybutylene adipate-co-terephthalate, polybutylene succinate-co-terephthalate, polybutylene succinate-co-adipate, polybutylene succinate, and polybutylene carbonate, and may more specifically include polybutylene adipate-co-terephthalate.

Also, the aliphatic/aromatic polyester may have a weight-average molecular weight of 10,000 g/mol to 500,000 g/mol, for example, 30,000 g/mol to 150,000 g/mol, and, in this case, the mechanical properties of the composite including the same may be better.

Furthermore, the present invention provides a method of preparing the polyalkylene carbonate-polylactic acid composite.

The preparation method according to an embodiment of the present invention is characterized in that it includes the steps of: preparing a mixed solution by stirring polyalkylene carbonate and polylactic acid in the presence of a non-halogen ether-based solvent (step 1); and devolatilizing and extruding the mixed solution (step 2).

Herein, detailed descriptions of the non-halogen ether-based solvent, the polyalkylene carbonate, the polylactic acid, and the aliphatic/aromatic polyester are as described above.

Step 1 is a step for preparing a mixed solution by uniformly mixing polyalkylene carbonate and polylactic acid, wherein it may be performed by mixing the polyalkylene carbonate and the polylactic acid in the presence of a non-halogen ether-based solvent, and the mixing in this case may be performed by stirring.

As another example, in step 1, an aliphatic/aromatic polyester may be further used during the stirring, that is, step 1 may be performed by mixing the polyalkylene carbonate, the polylactic acid, and the aliphatic/aromatic polyester in the presence of the non-halogen ether-based solvent.

In a case in which the mixed solution is prepared by mixing the polyalkylene carbonate and the polylactic acid, the polyalkylene carbonate and the polylactic acid may be mixed in a weight ratio of 1:9 to 9:1, for example, 1:1 to 7:3, and, in a case in which the mixed solution is prepared by mixing the polyalkylene carbonate, the polylactic acid, and the aliphatic/aromatic polyester, the polyalkylene carbonate, the polylactic acid, and the aliphatic/aromatic polyester may be mixed in a weight ratio of 1:1:0.1 to 5:5:1. In the present invention, the polyalkylene carbonate-polylactic acid composite is prepared by solution mixing of the polyalkylene carbonate and the polylactic acid; or the polyalkylene carbonate, the polylactic acid, and the aliphatic/aromatic polyester, wherein, since no chemical synthesis occurs or washing after the mixing is not performed, the addition ratio may be the same as the ratio of the polyalkylene carbonate and the polylactic acid; or the polyalkylene carbonate, the polylactic acid, and the aliphatic/aromatic polyester in the composite.

The stirring may be performed without particular limitation as long as the polyalkylene carbonate and the polylactic acid; or the polyalkylene carbonate, the polylactic acid, and the aliphatic/aromatic polyester are sufficiently mixed so as to form a uniform mixed solution by being completely dissolved in the non-halogen ether-based solvent, but the stirring, for example, may be performed at a stirring speed of greater than 0 rpm to 50 rpm in a temperature range of 25° C. to 100° C. for 0.1 hours to 1 hour. In this case, a uniform mixed solution may be prepared.

Step 2 is a step for preparing a polyalkylene carbonate-polylactic acid composite by removing the solvent from the mixed solution and extruding the mixed solution thus obtained, wherein step 2 may be performed by devolatilizing and extruding the mixed solution, and the prepared composite may have a pellet shape.

The devolatilization may be performed by a conventional method without particular limitation as long as it may completely remove only the non-halogen ether-based solvent from the mixed solution, but, for example, may be performed in a temperature range of 50° C. to 120° C., wherein a pressure may be applied or the devolatilization may be performed at normal pressure, and, specifically, in a case in which the pressure is applied, the pressure may be appropriately adjusted within a pressure range of $1.33 \times 10^{-6}$ kPa or more to less than 101.325 kPa. In this case, only the solvent may be easily removed from the mixed solution.

Also, the extrusion may be performed by a conventional method, and, for example, may be performed using one of mixing processing equipment such as a twin-screw extruder, a single-screw extruder, a roll-mill, a kneader, or a Banbury mixer.

In addition, the present invention provides a molded article prepared by using the above-described polyalkylene carbonate-polylactic acid composite.

The molded article according to an embodiment of the present invention may be one prepared by processing, such as injecting, the composite, and, as another example, the molded article may be one prepared by melt mixing a plastic, such as polyalkylene carbonate or polylactic acid, with the composite and processing, such as injecting, the melt-mixed composite, wherein, in this case, the polyalkylene carbonate-polylactic acid composite according to the present invention may be used as a master batch.

Also, the molded article according to the embodiment of the present invention, for example, may include at least one selected from the group consisting of a film, a packaging material, an oriented film, an injection molded article, a blow molded article, a laminate, a tape, a nonwoven fabric, and a yarn. Herein, the molded article may include both uses of a food container and a product that requires direct contact with the human body.

Since the molded article according to the present invention is prepared by using the polyalkylene carbonate-polylactic acid composite, transparency, flexibility, and mechanical properties may all be excellent.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1

A mixed solution was prepared by stirring until polyethylene carbonate (Mw 140,000 g/mol) and polylactic acid (PLA 2003D, NatureWorks LLC) were completely dissolved in the presence of 1,3-dioxolane. In this case, the polyethylene carbonate and the polylactic acid were mixed in a weight ratio of 1:1, the 1,3-dioxolane was removed from the prepared mixed solution by a devolatilization process, and a pellet-type composite was prepared by using an extruder.

Example 2

A pellet-type composite was prepared in the same manner as in Example 1 except that a mixed solution was prepared by mixing polyethylene carbonate, polylactic acid, and polybutylene adipate-co-terephthalate (Mw 130,000 g/mol) in a weight ratio of 5:5:1, instead of the polyethylene carbonate and the polylactic acid, in Example 1.

Example 3

A pellet-type composite was prepared in the same manner as in Example 2 except that a mixed solution was prepared by mixing polyethylene carbonate, polylactic acid, and polybutylene adipate-co-terephthalate (Mw 130,000 g/mol) in a weight ratio of 1:1:0.1 in Example 2.

Comparative Example 1

A pellet-type composite was prepared by uniformly mixing pellets of pellet-type polyethylene carbonate (Mw 140,000 g/mol) and polylactic acid (PLA 2003D, NatureWorks LLC) in a weight ratio of 1:1 and melt mixing the mixed pellets using an extruder.

Comparative Example 2

A pellet-type composite was prepared by uniformly mixing pellets of pellet-type polyethylene carbonate (Mw 140,000 g/mol), polylactic acid (PLA 2003D, NatureWorks LLC), and polybutylene adipate-co-terephthalate (Mw 130,000 g/mol) in a weight ratio of 5:5:1 and melt mixing the mixed pellets using an extruder.

Comparative Example 3

A pellet-type composite was prepared in the same manner as in Example 2 except that dichloromethane was used instead of the 1,3-dioxolane in Example 2.

Experimental Example 1

An amount of the solvent remaining in each composite pellet of the examples and the comparative examples was measured using nuclear magnetic resonance (NMR), and a cross-section of each pellet was checked by a scanning electron microscope to measure a particle size of a dispersed phase in a matrix of each composite. The results thereof are presented in Table 1 below.

(1) NMR Analysis

NMR analysis was performed at room temperature (about 25° C.) using an NMR spectrometer including a Varian Unity Inova (500 MHz) spectrometer with a triple-resonance 5 mm probe. Each pellet was diluted in a solvent ($CDCl_3$) for NMR measurement to a concentration of about 10 mg/ml to be used as a sample.

2) Scanning Electron Microscope (SEM) Analysis

Cross-sectional morphology of each pellet was checked by scanning electron microscope analysis using a SU-8020 FESEM under the conditions of an acceleration voltage of 5 kV and an emission current of 10 μA, and shown in FIGS. 1 and 2. Domain sizes of 30 dispersed phases were checked from a cross-sectional SEM image of each pellet.

TABLE 1

| Category | Example 1 | Example 2 | Example 3 | Comparative Example 1 | Comparative Example 2 | Comparative Example 3 |
|---|---|---|---|---|---|---|
| Halogen component (wt %) | — | — | — | — | — | 0.03 |
| 1,3-dioxolane (wt %) | 0.03 | 0.04 | 0.02 | <0.01 | <0.01 | — |
| Domain size distribution of dispersed phase (μm) | 0.2~1.0 | 0.3~0.9 | 0.2~1.0 | 0.7~3.3 | 0.6~3.0 | 0.2~0.8 |

1,3-dioxolane was used during the preparation of the polyethylene carbonate as one of raw materials used in the preparation of the composite, and thus, a small amount of the 1,3-dioxolane may be included in the polyethylene carbonate. Thus, 1,3-dioxolane detected in Comparative Examples 1 and 2 of Table 1 was derived from the polyethylene carbonate used as the raw material.

As confirmed from Table 1, Examples 1 to 3 had a domain size distribution of the dispersed phase of 0.2 μm to 1.0 μm in comparison to those of Comparative Examples 1 and 2, wherein it was confirmed that the domain size distributions were significantly narrower than those of Comparative Examples 1 and 2. Also, a more pronounced difference was identified through FIGS. 1 and 2. In FIG. 1, most of domains of the dispersed phase had a predetermined size and were evenly distributed, but, in FIG. 2, domains of the dispersed phase had various sizes ranging from relatively small to relatively large. In this case, FIG. 1 is an SEM image of a cross-section of the pellet of Example 1, and FIG. 2 is an SEM image of a cross-section of the pellet of Comparative Example 1.

From the above results, since the polyalkylene carbonate-polylactic acid composite according to the present invention was prepared by solution mixing, it was confirmed that the polyalkylene carbonate-polylactic acid composite had uniform properties while the domain size of the dispersed phase was fine.

Also, as illustrated in Table 1, since a halogen component was not included in Examples 1 to 3, it was confirmed that Examples 1 to 3 may also be widely used in industrial fields related to food containers.

Experimental Example 2

A blown film was prepared from each composite pellet of the examples and the comparative examples, and tensile strength, elongation, tear strength, and haze were measured by using the blown film. The results thereof are presented in Table 2 below.

The blown film of the each composite pellet was prepared by inflation molding each pellet using a single-screw extruder (Blow Film M/C, 50Φ, L/D=20) at an extrusion temperature of 150° C. such that a thickness became 0.06 mm. In this case, a die cap was set to 2.0 mm, and a blown-up ratio was set to 2.3.

1) Tensile Strength (kgf/cm$^2$) and Elongation (%)

After 5 dumbbell-shaped samples were prepared according to ASTM D638, tensile strength was measured using UTM-5566 (Universal Testing Machine, Instron) at a speed of 50 mm/min, tensile strengths of the 5 samples were measured, and each result was presented as an average of the five measurements.

Also, elongation was measured under the same conditions as those of the tensile strength, but elongation at the point where each of the five samples ruptures was measured, and each result was presented as an average of the five measurements. The elongation is a measure of flexibility of the film, wherein 150% or more indicates that the flexibility is sufficiently good.

2) Tear Strength (kg/cm)

After 5 samples were prepared according to ASTM D1004, tear strength was measured using UTM-5566 (Universal Testing Machine, Instron) at a speed of 50 mm/min, tear strengths of the 5 samples were measured, and each result was presented as an average of the five measurements.

3) Haze (%)

After a sample with a size of 5 cm×5 cm×0.3 mm (width×length×thickness) was prepared, haze was measured by transmitting light with a wavelength of 400 nm to 700 nm using a HM-150 Hazemeter (Murakami Color Research Laboratory, JP) according to ASTM D1003, and an opacity value (Haze, %), which measured scattered light with respect to the total transmitted light, was represented as a resultant value. Herein, the lower the haze value was, the better the transparency was.

TABLE 2

| Category | Example 1 | Example 2 | Example 3 | Comparative Example 1 | Comparative Example 2 | Comparative Example 3 |
|---|---|---|---|---|---|---|
| Tensile strength (kg/cm$^2$) | 394 | 434 | 427 | 354 | 338 | 400 |
| Elongation (%) | 156 | 213 | 189 | 251 | 220 | 124 |
| Tear strength (kg/cm) | 140 | 141 | 113 | 89 | 85 | 135 |
| Haze(%) | 1.0 | 5.1 | 2.6 | 19.0 | 24.0 | 5.2 |

As illustrated in Table 2, it was confirmed that Examples 1 to 3 according to the present invention exhibited excellent tensile strength, elongation, tear strength, and haze with balance in comparison to Comparative Examples 1 to 3. Specifically, when Examples 1 to 3 were compared with Comparative Examples 1 and 2, tensile strengths were significantly increased by about 11% to about 26%, tear strengths were significantly increased by about 27% to about 66%, and haze values were significantly decreased to a level of ¼ to ¹⁄₂₄. In this case, elongations of Examples 1 to 3 were all greater than 150%, which were excellent. The results indicate that, since the polyalkylene carbonate-polylactic acid composite according to the embodiment of the present invention was prepared by solution mixing, compatibility between the materials may be significantly better than that when melt mixing was used, and thus, transparency may be significantly improved while flexibility and mechanical properties were excellent.

Also, the tensile strength, elongation, tear strength, and haze value of Examples 1 to 3 were improved in comparison to those of Comparative Example 3, and, particularly, Example 2 was prepared under the same conditions as in Comparative Example 3, except for the solvent, wherein the tensile strength was increased by about 8%, the tear strength was increased by about 4%, and, particularly, the elongation was significantly increased by about 172% while the haze value was equal to or better than that of Comparative Example 3. With respect to Comparative Example 3, elongation was significantly low, at less than 150%, and this indicates that flexibility of Comparative Example 3 was significantly reduced.

The invention claimed is:

1. A polyalkylene carbonate-polylactic acid composite comprising a continuous phase and a dispersed phase,
   wherein a domain size of the dispersed phase is in a range of 0.2 μm to 1.0 μm,
   wherein a halogen component is not included in the composite,
   wherein the composite comprises a polyalkylene carbonate and a polylactic acid in a weight ratio of 1:1 to 7:3,
   wherein a non-halogen ether-based solvent is included in an amount of 0.1 wt % or less in the composite,
   wherein the composite further comprises an aliphatic/aromatic polyester,
   wherein the composite comprises the polyalkylene carbonate, the polylactic acid, and the aliphatic/aromatic polyester in a weight ratio of 1:1:0.1 to 5:5:1, and
   wherein the polyalkylene carbonate-polylactic acid composite is a product of solution blending.

2. The polyalkylene carbonate-polylactic acid composite of claim 1, wherein the non-halogen ether-based solvent comprises at least one selected from the group consisting of 1,3-dioxolane, 1,2-dioxolane, and dioxane.

3. The polyalkylene carbonate-polylactic acid composite of claim 1, wherein the polyalkylene carbonate comprises at least one selected from the group consisting of polyethylene carbonate, polypropylene carbonate, polypentene carbonate, polyhexene carbonate, polyoctene carbonate, and polycyclohexene carbonate.

4. The polyalkylene carbonate-polylactic acid composite of claim 1, wherein the polyalkylene carbonate has a weight-average molecular weight of 10,000 g/mol to 1,000,000 g/mol.

5. The polyalkylene carbonate-polylactic acid composite of claim 1, wherein the polylactic acid has a weight-average molecular weight of 70,000 g/mol to 300,000 g/mol.

6. The polyalkylene carbonate-polylactic acid composite of claim 1, wherein the aliphatic/aromatic polyester comprises at least one selected from the group consisting of polybutylene adipate-co-terephthalate, polybutylene succinate-co-terephthalate, polybutylene succinate-co-adipate, polybutylene succinate, and polybutylene carbonate.

7. The polyalkylene carbonate-polylactic acid composite of claim 1, wherein the aliphatic/aromatic polyester has a weight-average molecular weight of 10,000 g/mol to 500,000 g/mol.

8. A molded article prepared by using the polyalkylene carbonate-polylactic acid composite of claim 1.

9. The molded article of claim 8, wherein the molded article is one selected from the group consisting of a film, a packaging material, an oriented film, an injection molded article, a blow molded article, a laminate, a tape, a nonwoven fabric, and a yarn.

\* \* \* \* \*